United States Patent [19]

Küsters

[11] Patent Number: 4,941,250

[45] Date of Patent: Jul. 17, 1990

[54] ROLLER FOR PRESSURE TREATMENT OF A CONTINUOUS WEB OF MATERIAL

[76] Inventor: Karl-Heinz Küsters, Hermann-Schuhmacher Strasse 49, D-4150 Krefeld-Forstwald, Fed. Rep. of Germany

[21] Appl. No.: 312,115

[22] Filed: Feb. 17, 1989

[30] Foreign Application Priority Data

Feb. 20, 1988 [DE] Fed. Rep. of Germany ....... 3805323

[51] Int. Cl.$^5$ .............................................. B21B 13/02
[52] U.S. Cl. .................................. 29/116.1; 29/116.2; 384/99
[58] Field of Search .................... 29/116.1, 116.2, 117; 384/99

[56] References Cited

U.S. PATENT DOCUMENTS

| | | |
|---|---|---|
| 3,885,283 | 5/1975 | Biondetti ............................. 29/116.2 |
| 4,064,607 | 12/1977 | Wolf ................................... 29/116.2 |
| 4,726,691 | 2/1988 | Lehmann ............................ 29/116.2 |

FOREIGN PATENT DOCUMENTS

| | | |
|---|---|---|
| 2230139 | 6/1972 | Fed. Rep. of Germany . |
| 2254392 | 7/1972 | Fed. Rep. of Germany . |
| 2849253 | 11/1978 | Fed. Rep. of Germany . |

Primary Examiner—Timothy V. Eley
Assistant Examiner—K. Jordan

[57] ABSTRACT

A hydraulically supported roller comprises a hollow cylinder that rotates about a stationary cross-head. Cylindrical recesses are radially disposed in the cross-head. Piston-like supporting plungers are displaceable in the recesses against the inner circumference of the cylinder. To limit the stroke of the supporting plunger in the cylinder recess and, hence, the displacement of the cylinder relative to the cross-head, at least one conduit is provided, which leads from the interior of the cylindrical recess to the clearance space outside of the cross-head. Pressure fluid is allowed to escape from the cylindrical recess to limit the stroke when the conduit is uncovered at a predetermined stroke by the supporting plunger.

5 Claims, 1 Drawing Sheet

ROLLER FOR PRESSURE TREATMENT OF A CONTINUOUS WEB OF MATERIAL

BACKGROUND OF THE INVENTION

The invention relates generally to a roller for the pressure treatment of a continuous web of material and more specifically to an improved device for limiting the displacement of the roll cylinder in a hydraulically supported roller.

German Patent No. 22 30 139 discloses a transversely controlled, hydraulically supported roller in which several supporting plungers, arranged in a row on the cross-head along the side of the roller adjacent the roll gap, can independently be pressurized with pressure fluid. In this manner, the supporting plungers function to provide predetermined counteracting forces that act against the inner circumference of the outer roll cylinder to produce a specific line pressure distribution whereby the cross-head, under the influence of the counteracting forces, can bend inside the cylinder.

While the cylinder disclosed in German Patent No. 22 30 139, is supported at its ends by the cross-head, German Patent No. 22 54 392 discloses a roller having a so-called "internal stroke" whereby the cylinder can move radially opposite the cross-head. At the roll ends, the cylinder is only supported by a guide ring, which can be displaced radially opposite the cross-head.

In hydraulically supported rolls of the above-described types, the cross-head takes up most of the interior space of the cylinder. Therefore, only a small radial displacement path is available for the cross-head to bend. When a certain displacement is exceeded, damage can occur. This damage can be avoided by limiting the stroke of the supporting plungers.

In the case of first-described rollers, in which the cylinders are supported at their ends by the cross-head, no relative radial displacement of the cross-head and cylinder takes place at the extremities. Displacement can only occur at the middle of the roller, where the cross-head, as a result of the deflection, bends to the other side of the roller opposite the direction of the force of the central supporting elements. However, in the case of the second-described rollers that have an "internal stroke", the cross-head can move over its entire length.

The damage that can occur when the displacement is too great is brought about when the outer bending side of the cross-head contacts the inner circumference of the cylinder. In this manner, the surface at the inner circumference of the cylinder may be damaged. Damage also can result, if a supporting plunger extends too far out of its cylinder recess. Finally, in the case of rollers with an "inner stroke", the mating rolls or corresponding elements supported by the roller may be shifted to an extent that is harmful.

Previous attempts to solve this problem involve retaining the cross-head in a desired nominal position. For example, in German Pat. No. 30 26 865, the position of the outer roll shell or cylinder is measured relative to the cross-head, and the pressure fluid applied to the individual supporting elements is controlled accordingly. The roller disclosed in German Pat. No. 28 49 253 functions in a similar manner. This roller has an "inner stroke" and includes a valve arranged between the guide ring and the cross-head. The valve allows the pressure in the supply line to the individual supporting elements to fall when a specific displacement between the cross-head and the cylinder becomes too great.

All of these previously attempted solutions, in addition to being costly, involve controlling the pressure supplied to the supporting elements by means of controlled valve arrangements. Therefore, the security of the safe operation of these apparatus can only be as effective as the operability of the valve arrangements they employ.

The invention is directed to the problem of achieving a simpler and more secure stroke limitation in hydraulically supported rollers.

SUMMARY OF THE INVENTION

The invention solves this problem by providing a roller for the pressure treatment of a continuous web of material comprising a cylinder having an outer surface that forms a working roller circumference, a stationary cross-head extending through the cylinder to form a clearance space therewith between the cross-head and the inner circumference of the cylinder, a hydraulic support mechanism acting against the inner circumference of the cylinder to support the cylinder upon on the cross-head, with the hydraulic support mechanism including piston-like supporting plungers displaceable in respective cylindrical recesses radially disposed in the cross-head to abut against the inner circumference of the cylinder, with the recesses provided with respective supply lines through which pressure fluid is conducted and a device limiting the displacement of the cylinder relative to the cross-head including at least one of the supporting plungers and at least one conduit having an inlet connected to one of the cylindrical recesses and an outlet connected to the clearance space outside of the cross-head wherein the inlet is sealed by the at least one supporting plunger until it uncovers the inlet to permit flow through the at least one conduit.

When the conduit is uncovered, the pressure under the piston-like supporting plunger immediately breaks down and the plunger has reached a specific limiting stroke. This limiting stroke can be calculated from the dimensions of the cylinder and the cross-head, as well as the supporting plunger. This type of stroke limitation does not require any valve or control elements; instead the stroke limitation is accomplished in the simplest possible way, without the switching on of mechanically moving or even electrical parts. Use of a conduit of the type described herein is contemplated for rollers regardless of Whether the roller is of the "inner stroke" type, although the main area of application concerns the "inner stroke" type rollers because the problem of the excessive radial displacement of the cylinder relative to the cross-head is greater in this type of roller.

The conduit may be formed by a milled cut-out in a upper wall portion of the cylindrical recess or by an oblique-drilled duct.

DETAILED DESCRIPTION

Figure 1:
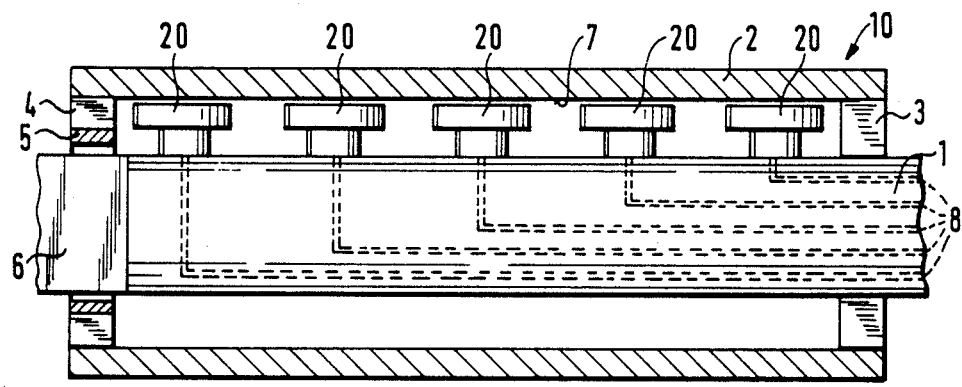
FIG. 1 illustrates a longitudinal side view of a roller constructed according to the principles of the invention, shown partially in section.

The roller generally designated at 10 comprises a stationary cross-head 1 and a hollow cylinder 2, which surrounds the cross-head to form an annular clearance space therewith, with the cylinder being rotatable about the cross-head. To guide and support the cylinder 2 on the cross-head 1, there are two possibilities. The right side of FIG. 1 depicts the cylinder 2 directly supported on the cross-head by bearing 3 and, therefore, when such an arrangement is provided at both ends of roller 10, the ends of cylinder 2 cannot move radially opposite the cross-head 1. The second possibility is shown on the left side of FIG. 1. The left end of the cylinder 2 is shown supported by a bearing 4 on a guide ring 5. The inner opening of the guide ring is not circular, but rather is slotted such that the cylinder can move, i.e. slide up and down, on the corresponding flattened end 6 of the cross-head. This type of guidance results in a roller with a so-called "inner stroke", which means that the cylinder 2 can only execute a stroke with means found inside the roller 10, i.e. with the stationary cross-head 1.

In the specific embodiment of FIG. 1, the roll gap formed between the roller 10 and an adjacent roller (not shown) is located on the top side of the cylinder 2 as shown in FIG. 1, and five supporting plungers 20 are provided. The plungers are located inside the cylinder 2 in the cylinder recesses 9 of the cross-head 1. They are equidistantly spaced in a row on the side of the roll gap and abut against the inner circumference of the cylinder 2. Plungers 20 can be pressurized to produce a predeterminable force by hydraulic pressure supplied through separate lines 8 to each supporting plunger 20. In this manner, a specific line pressure distribution is provided.

Figure 2:
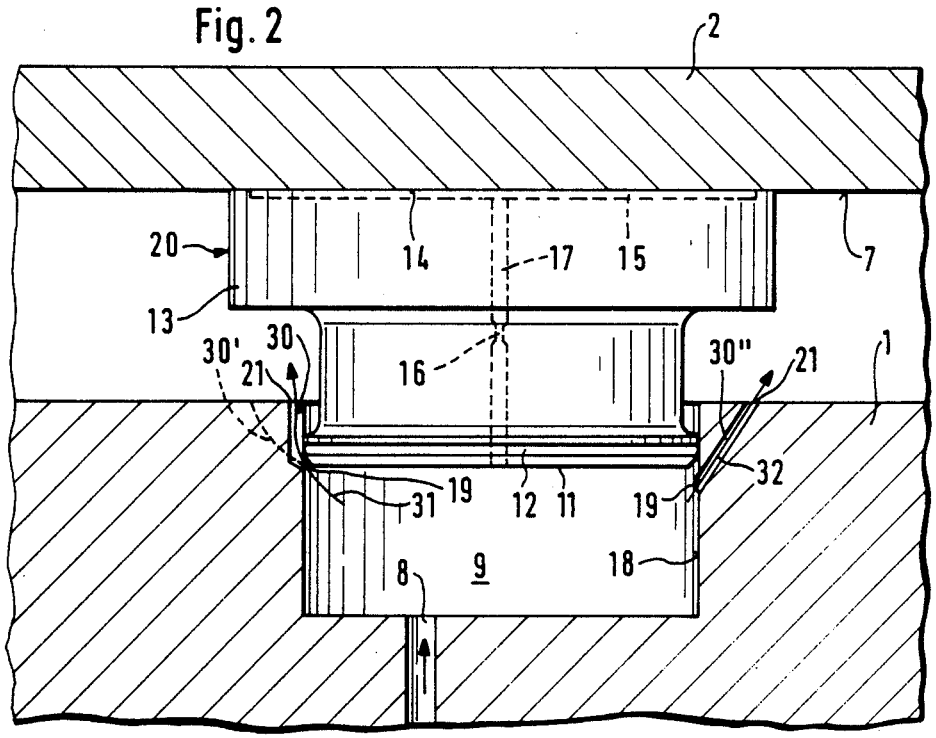
FIG. 2 illustrates an enlarged, partially sectional view of a representative supporting plunger and adjacent portions of the cross-head and cylinder shown in FIG. 1.

In FIG. 2, a representative one of the supporting plungers 20 is illustrated. The cylinder recesses 9 are provided in the upper side of the cross-head 1. A respective supply line 8 discharges pressurized fluid into its associated cylinder recess 9. The piston-like supporting plunger 20 has a base portion 11, which is sealed by a sealing ring 12 in a manner similar to a piston ring, disposed in the cylinder recess 9. The top portion 13 of the supporting plunger 20 has a contact surface 14 shaped to correspond to the inner circumference 7 of the cylinder 2. Top portion 13 is provided with a hydrostatic chamber 15 formed in the contact surface 14. Chamber 15 can be supplied With hydraulic pressure fluid from the cylinder chamber 9, via a bore hole 17 provided with a restrictor 16. In this manner, the supporting plunger 20 is braced against the inner circumference 7 of the cylinder 2 by a hydrostatic pressure cushion. Thereby, the result of the arrangement of the hydrostatic chambers 15 is to ensure that a pressure fluid film is maintained between the edges of the contact surfaces 14 to avoid metallic-metallic contact between cylinder 2 and plungers 20.

When pressure is applied to the cylinder chamber 9 through line 8, the supporting plunger 20 exerts a force, which according to FIG. 2 is upwardly directed against the inner circumference 7 of the cylinder 2. To prevent cylinder 2 from being displaced too far upwardly relative to the cross-head 1, i.e. to limit the stroke of the supporting plunger 20, a conduit 30 is provided on the left side of the supporting plunger 20, according o FIG. 2. Normally, this means, if the supporting plunger 20 moves deeper into the cylinder chamber 9 than represented, the conduit will be sealed by the base 11 of the supporting plunger 20 or by the seal 12, and the pressure fluid in the cylinder chamber 9 cannot escape to the clearance space via conduit 30. The inlet 19 of the conduit 30 is opened only if the supporting plunger 20 reaches the limiting stroke position represented in FIG. 2, such that pressure fluid can escape from the cylinder chamber 9 in the direction of the arrow 31. In this manner, the pressure in chamber 9 immediately decreases to prevent the supporting plunger 20 from moving further outwardly past the limit position.

The conduit 30 leading from the wall 18 of the cylinder chamber 9 to the clearance space outside of the cross-head 1 is depicted schematically. In practice, such a conduit can be produced in different ways. One example is a borehole, which leads parallel to the axis of the cylinder chamber 9 up to a predetermined depth. The borehole may be chamfered when the cylinder chamber 9 is hollowed out by turning. Alternatively, the conduit may comprise a saw cut 30' introduced in the upper edge of the cylinder chamber 9 in its axial plane. Still another example is an oblique-drilled duct 30", which leads from an inlet 19 in the wall 18 of the cylinder chamber 9 to an outlet 21 formed in the top side of the cross-head 1, through which the pressure fluid can flow in the direction of the arrow 32 when the seal ring 12 or base 11 clears the inlet 19. Thus, the illustrated conduits 30, 30', 30" are alternative specific embodiments of the conduit; normally, only one type of conduit or one conduit is provided.

The sole determining factor is that at a predetermined limiting stroke height of the supporting element, a conduit 30, 30', 30" is opened by the plunger to allow for the egress of pressurized fluid in the cylinder chamber 9. From this function, the dimensioning of the lateral section of the conduits 30, 30'30" is determined. The conduits must be sized in proportion to the volume of the pressure fluid that can be transported through the supply line 8, or in accordance with the working capacity of the pump, such that when the inlet of the conduit is opened, a sufficient pressure drop occurs in the cylinder chamber to prevent further outward movement of the supporting plunger.

Not all of the supporting plungers 20 of a roller 10 necessarily must be provided with conduits 30, 30', 30". In many cases, more than the five supporting plungers depicted schematically in FIG. 1 are present. Specific quantities of pressure fluid are provided, at a time, to groups of plungers connected with a common supply line. In such a case, it can suffice to provide only one supporting element 20 in each group with a conduit 30, 30', 30".

Flow monitoring devices also can be provided to respond to a predetermined flow, which suddenly appears in a supply line 8 when the pressure fluid escapes through the conduits 30, 30', 30". The flow monitoring device may then be operable to affect the pressure in the other supporting elements and/or activate display and-/or alarm units.

What is claimed is:
1. A roller for the pressure treatment of a continuous web of material comprising:
  a cylinder having an outer surface that forms a working roller circumference;
  a stationary cross-head extending through the cylinder to form a clearance space therewith between the cross-head and the inner circumference of the cylinder, a hydraulic support mechanism acting against the inner circumference of the cylinder to support the cylinder on the cross-head, said hydraulic support mechanism including piston-like supporting plungers displaceable in respective cylindrical recesses radially disposed in the cross-head to abut against the inner circumference of the cylinder, said recesses provided with respective supply lines through which pressure fluid is conducted; and a device limiting the displacement of the cylinder relative to the cross-head including at least one of said supporting plungers and at least one conduit having an inlet connected to one of said cylindrical recesses and an outlet connected to said clearance space outside of the cross-head wherein said inlet is sealed by said at least one supporting plunger until it uncovers the inlet to permit flow through said at least one conduit.

2. Apparatus according to claim 1 wherein said at least one conduit is formed by a milled cut-out in an upper portion of a wall that forms said one cylindrical recess.

3. Apparatus according to claim 1 wherein said at least one conduit is formed by an oblique-drilled duct leading from a wall that forms said one cylindrical recess to the clearance space outside of the cross-head.

4. Apparatus according to claim 1 further comprising bearings at each end of said cylinder directly supporting said cylinder for rotation about said cross-head and preventing radial movement of said cylinder ends relative to said cross-head.

5. Apparatus according to claim further comprising bearings at each end of said cylinder supporting said cylinder for rotation about said cross-head and a guide ring at each end of said cylinder supporting said cylinder ends for radial movement relative to said cross-head.

* * * * *

UNITED STATES PATENT AND TRADEMARK OFFICE
CERTIFICATE OF CORRECTION

PATENT NO. : 4,941,250
DATED : JULY 17, 1990
INVENTOR(S) : KARL-HEINZ KüSTERS

It is certified that error appears in the above-identified patent and that said Letters Patent is hereby corrected as shown below:

In the Title Page, please add

[73] Assignee: Eduard Küsters Maschinenfabrik Gmbh & Co KG, Krefeld, Fed, Rep. of Germany Column 3, line 31 should read --and abut the inner circumference 7 of the cylinder-- line 65 should read --left side of the supporting plunger 20, according to FIG.--

Column 6, line 14, claim 5, should read --Apparatus according to claim 1 further comprising--

Signed and Sealed this

Twenty-eighth Day of April, 1992

Attest:

HARRY F. MANBECK, JR.

*Attesting Officer*    *Commissioner of Patents and Trademarks*